Aug. 30, 1960 E. A. QUADE 2,951,241

MAGNETIC STORAGE DEVICE

Filed Dec. 11, 1957 2 Sheets-Sheet 1

INVENTOR.
EDWARD A. QUADE

BY

John B. Sponsler
AGENT

United States Patent Office 2,951,241
Patented Aug. 30, 1960

2,951,241

MAGNETIC STORAGE DEVICE

Edward A. Quade, San Jose, Calif., assignor to International Business Machines Corporation, New York, N.Y., a corporation of New York Filed Dec. 11, 1957, Ser. No. 702,037

5 Claims. (Cl. 340—174)

This invention relates to the storing of information in permanent magnetic materials depending upon the property of the resonance of small unit volumes.

More particularly the invention is concerned with a small particle of magnetic material forming a component of a magnetic core, perhaps having the dimensions of a molecule of the material, wherein the building up of large energies within the realm of the particle occurs when its resonant frequency is imposed upon it. One manner in which this effect may be realized is by subjecting a permanent magnetic material to various frequencies of magnetic excitation, each frequency corresponding to the resonant frequency of a particle within the material, under conditions of magnetic pre-saturation of the material and of non-saturation of the material, and comparing the energies derived as a result of these varying conditions for each critical frequency. The measure of resulting energy level for each condition therefore becomes a means for determining under which condition the resonant frequency has been applied, thereby deriving a function representative of the storage of energy at each critical frequency.

It is therefore an object of this invention to provide a magnetic storage device wherein the energy level of a particle of a permanent magnetic material at the resonant frequency of the particle represents the presence of a stored pulse.

Another object of this invention is to provide a magnetic storage device wherein a permanent magnetic material having a plurality of particles resonating at different frequencies may be subjected to two or more conditions of magnetic excitation and a determination of the resulting energy levels is indicative of an applied resonant frequency.

It is a still further object of this invention to provide a magnetic storage device wherein the energy level of a resonant particle is representative of a stored pulse at the resonant frequency of the particle.

Other objects of the invention will be pointed out in the following description and claims and illustrated in the accompanying drawings which disclose, by way of example, the principle of the invention and the best mode which has been contemplated of applying that principle.

Figure 9:
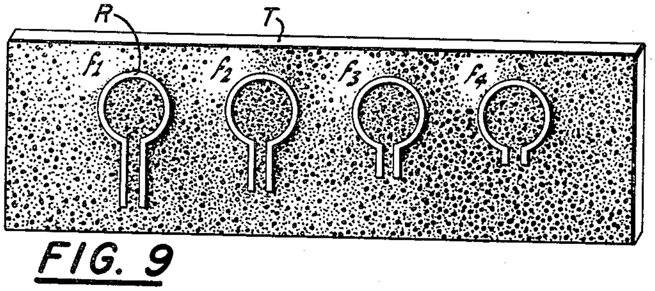
Fig. 9 is a diagram illustrating modification of the storage medium of Fig. 4.
Figure 9A:
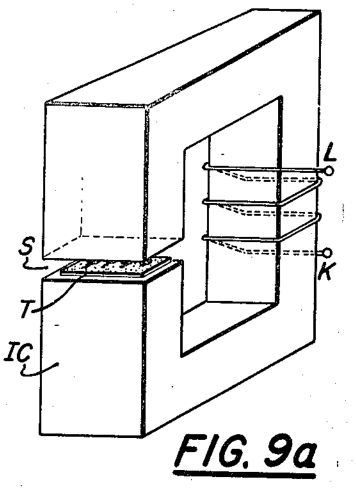

Fig. 9*a* is a diagram of an arrangement for recording and sensing information within the storage medium in Fig. 9.

Figure 4:
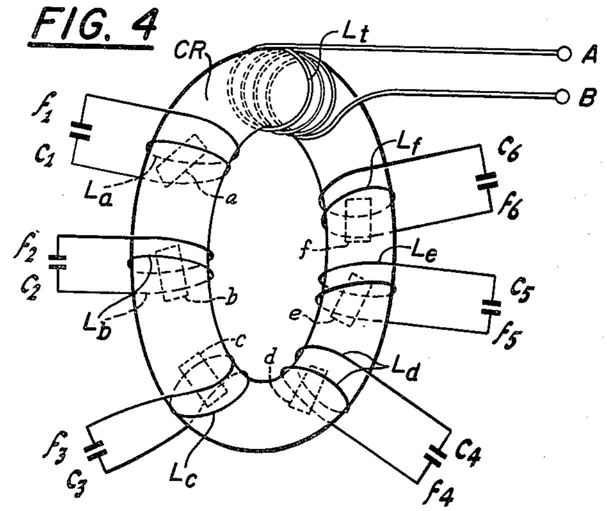
Fig. 4 is a diagram illustrating a storage medium in the form of a toroidal core with a plurality of LC resonating circuits.
Figure 10:
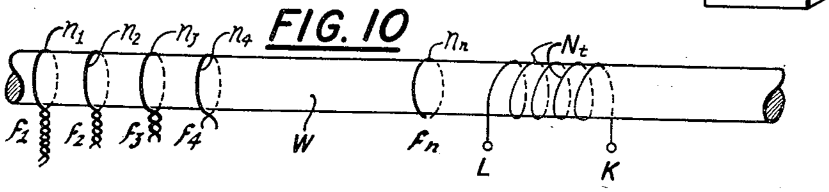

Fig. 10 is a diagram illustrating a further modification of the storage medium of Fig. 4.

Figure 1:
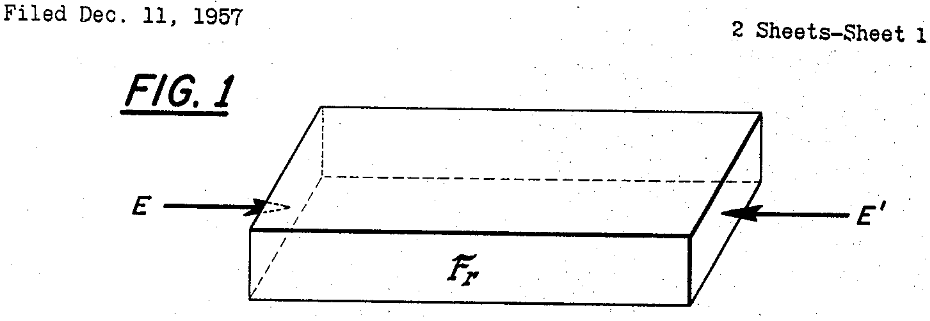
Figs. 1–3 are diagrams illustrating the manners in which a particle of material may be electrically stressed.

The broad underlying principle of the present invention is based upon phenomena related to the normal properties of magnetic materials, one of which is the resonance of small unit volumes. In general a small particle of the material is concerned, each particle having its own resonant frequency and having the effect of building up a relatively large amount of energy within itself when this critical frequency is imposed upon it, for example, by electromagnetic means. Fig. 1 of the drawings illustrates basically the effect of stressing electromagnetically a small particle via forces E and E′ whereby energy is set up within the particle at a resonant frequency $F_r$.

Figure 2:
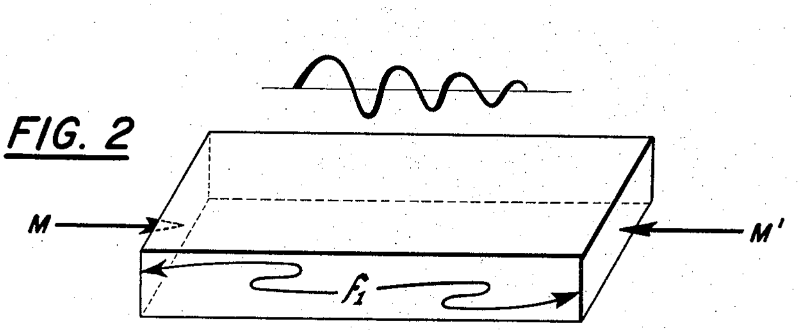
Figure 3:
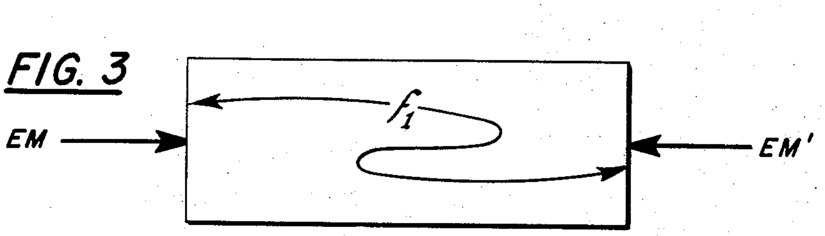

A particle of material may also be stressed by the magnetostrictive effect of electromagnetic forces as shown in Fig. 2 of the drawings via sonic resonance when a proper multiple or submultiple of the wavelength of sound is a measurement of its length. The sound wave, which is impressed by magnetostrictive forces M and M′, resonates from one end of the particle to the other at a frequency $f_1$. In a similar manner an electromagnetic wave may be induced into a particle directly by electromagnetic means EM and EM′ as indicated in Fig. 3 of the drawings, the induced wave bouncing back and forth between the extremities of the particle at a resonant frequency $f_1$.

Similarly, so-called domain resonance may be obtained by way of the transfer of energy from one wall of a domain of a magnetic particle to another wall at a finite resonant frequency, and the effect may be extended to bring about electron or nuclear resonance of a similar nature depending upon the action of the nucleus of the atoms and upon the electrons composing the magnetic particle.

In other words, the properties of resonance of small unit volumes are natural phenomena, and it is a further object of this invention to make use of these phenomena through artificial simulation of the conditions set forth above. Fig. 4 of the drawings illustrates generally the manner in which a structure may be arranged to effect simulation of the above mentioned phenomena.

Referring to Fig. 4, a doughnut shaped core CR of retentive magnetic material, similar to that shown in U.S. Patent 2,708,722, is provided with a winding $L_t$ having terminals A and B. At random locations along the core CR additional windings $L_a$, $L_b$, $L_c$, $L_d$, $L_e$ and $L_f$ are provided, each winding respectively being connected across the capacitors $C_1$, $C_2$, $C_3$, $C_4$, $C_5$ and $C_6$, thereby forming a series of LC circuits normally resonating respectively at frequencies $f_1$, $f_2$, $f_3$, $f_4$, $f_5$, and $f_6$. It may be assumed that each of the LC circuits corresponds to a particle of the magnetic material represented respectively by the particles (dotted) *a*, *b*, *c*, *d*, *e* and *f*.

It is to be pointed out that a permanent magnetic material is chosen, for example in Fig. 4 the core CR, wherein there are particles that are highly resonant, each particle resonating at a different frequency and being statistically different from any of its neighbors, and all of the particles lying within some predetermined frequency range. It is also to be pointed out that the resonant characteristics of all of these particles (and of the corresponding LC circuits, each having a portion of the core CR included) are changed when they are saturated magnetically. This property is well known in the art and has been substantiated by many experiments wherein it has been demonstrated that values of resonant frequency, amplitude of resonance, and losses sustained during resonance are generally different under conditions of magnetic saturation and aligned particles as compared with conditions of non-saturation and randomly arranged particles.

Figure 6:
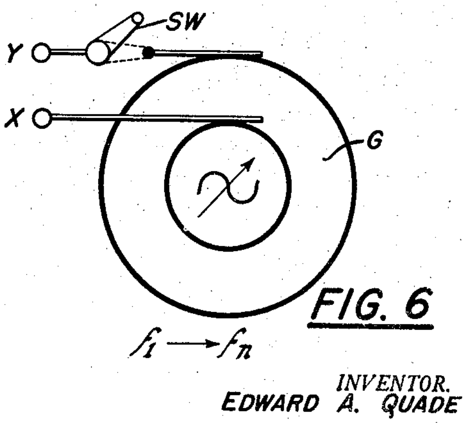
Fig. 6 is a diagram illustrating an A.C. generator.
Figure 5:
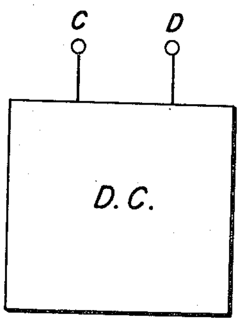
Fig. 5 is a diagram illustrating a D.C. source.

Reference is made to Fig. 5 of the drawings representing a direct current source of voltage having the output terminals C and D capable of delivering enough current to the terminals A and B of the winding $L_t$ to saturate the core CR. Reference is also made to Fig. 6 which represents an alternating current generator G capable of delivering current at its terminals X and Y over a variable frequency range from $f_1$ to $f_n$. Additionally, reference is made to Fig. 7 of the drawings which represents a variable frequency oscillator including a meter Q for determining the "Q" factor of a circuit when the terminals O and N are suitably connected to the circuit to be tested. The oscillator is of the conventional Hartley type employing a vacuum tube VT, a pair of inductances $L_1$ and $L_2$ together with a variable capacitor $CAP_3$ for covering a range of frequencies from $f_1$ to $f_n$, the output of this oscillator being provided to the terminals O and N via the coupling capacitors $CAP_1$ and $CAP_2$, respectively.

Figure 7:
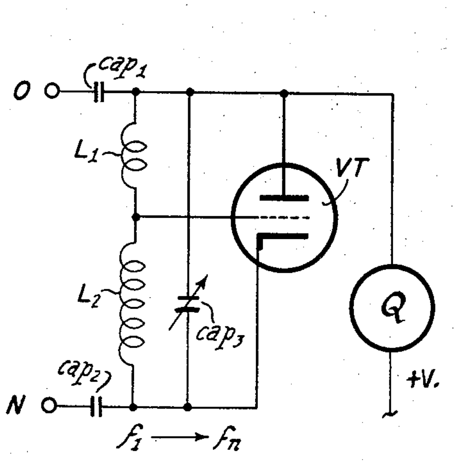
Fig. 7 is a diagram illustrating a variable frequency oscillator including a meter for determining the "Q" factor.
Figure 8:
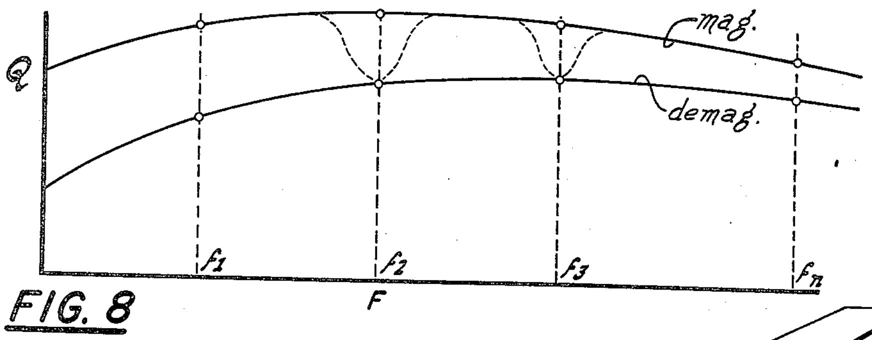
Fig. 8 is a curve illustrating the relative value of "Q" for various oscillator frequencies.

Referring now to Figs. 4, 5 and 7, let it be assumed that the winding $L_t$ is connected by its terminals A and B to the terminals O and N of the oscillator (Fig. 7) and values of "Q" are plotted for oscillator frequencies $f_1, f_2, f_3 \ldots f_n$. A curve will result corresponding to that curve indicated at *demag* in Fig. 8 of the drawings. Let it be further assumed that the terminals A and B of the winding $L_t$ are removed from the oscillator and connected to the direct current source of Fig. 5 so that current is passed through the winding to saturate the core CR and that the terminals A and B are thereafter connected to the oscillator terminals O and N, as before, and again the values of "Q" are plotted for oscillator frequencies $f_1, f_2, f_3 \ldots f_n$. Another curve will result corresponding to the curve indicated at *mag* in Fig. 8. In other words, there are different "Q" factors for the various frequencies involved depending upon the saturation or non-saturation (alignment or disalignment) of the particles composing the magnetic core CR. If, for example, the particles having resonant frequencies at $f_2$ and $f_3$ were demagnetized and all other particles over the range $f_1$ to $f_n$ remained saturated, there would be dips in the curve indicated at *mag* in Fig. 8 as shown by the dotted lines.

It therefore becomes apparent that a means has been provided whereby a type of binary information can be stored. In other words, the unsaturated state of a particle treated in the manner described above may be considered to be a binary "zero" and the saturated state a binary "one," or vice versa, and since there is a wide band of frequencies covered, more than one binary "bit" can be stored in a single core such as the core CR (Fig. 4).

Although the actual process of storing information can be inferred from the foregoing description, it is actually accomplished as follows:

(1) The core CR is first saturated via direct current in a manner as discussed by connection of terminals of $L_t$ to the direct current source of Fig. 5.

(2) Thereafter the terminals A and B of $L_t$ are connected to the alternating current generator G of Fig. 6 and demagnetizing currents of selected frequencies (such as $f_2$ and $f_3$) are applied, the switch SW being kept open for all other frequencies.

(3) Thereafter the terminals A and B of $L_t$ are connected to the output O and N of the oscillator of Fig. 7 and the capacitor $CAP_3$ is swept over its control range corresponding to frequencies from $f_1$ to $f_n$. Each time there is a "dip" in the meter Q, the storage of a binary "bit" is thereby indicated.

A modified form of the arrangement of Fig. 4 is shown by Fig. 10 of the drawings wherein a wire W of retentive magnetic material is provided with a series of single turn insulated windings about the wire W, each single turn being provided with a progressively different amount of twist, the twist being provided to form a different capacitance for each single turn. In other words, a series of turns $n_1, n_2, n_3, n_4 \ldots n_n$ having resonant frequencies $f_1, f_2, f_3, f_4 \ldots f_n$ is provided. A winding $N_t$ is provided similar to the winding $L_t$ of Fig. 4 for recording and sensing of stored information. The wire W may be a closed loop or may merely be a length of wire having a winding $N_t$ around each end, the windings being connected in series or parallel non-opposing. It is obvious that a very large number of storage "bit" spaces can be provided in this manner since both the wire W and the single turn windings can have very small dimensions.

Fig. 9 is a further modification of the basic arrangement wherein a length of well known magnetic recording tape T is provided with keyhole shaped deposits of conductive material similar to the well known "printed circuit" arrangements. In this arrangement each conductive ring R is arranged with tails of varying lengths to give the capacitance variation for each ring R so as to provide LC circuits having resonant frequencies corresponding to $f_1, f_2, f_3, f_4$, etc. The arrangement for recording and sensing information with a storage tape T (as in Fig. 9) is shown in Fig. 9*a* of the drawings. Here a rectangular core IC is arranged to have an air gap or slot S into which the tape T can be inserted. A recording and sensing winding having the terminals L and K is wound upon the core IC. It is again obvious that the arrangement of Figs. 9 and 9*a* provides a further increased capacity for storage of magnetic "bits" since the rings R may be minute and the width of the slot S in the core IC can be made very large. Furthermore, it is obvious that any length of tape T may be passed through the slot S so a practically unlimited storage capacity is provided.

It is to be further pointed out that the magnetic storage system described in its various arrangements is exceedingly simple and easily and economically produced from well known magnetic and electrical components presently available.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A magnetic storage device comprising a magnetizable member including a plurality of magnetizable particles having different resonant frequencies, means for magnetically saturating said particles of said member, means for selectively impressing different demagnetizing frequencies upon said particles and means for sensing differences in the remanent magnetization of said particles, each said difference corresponding to one of said selected demagnetizing frequencies.

2. A magnetic storage device comprising a magnetizable member including a plurality of particles having different resonant frequencies, means for saturating said particles of said member, a plurality of windings upon said member, each said winding corresponding to a different one of said particles, means for selectively demagnetizing one of said particles corresponding to a selected winding by a current of its resonant frequency, and means for determining the winding thereby affected.

3. A magnetic storage device including a magnetizable member comprising a plurality of particles having different resonant frequencies, a plurality of impedances having resonant frequencies corresponding to the resonant frequencies of said particles, means for saturating said particles, means for selectively energizing one of said impedances to demagnetize the one of said particles associated with said selected impedance, means for determining impedance so selected.

4. A magnetic storage device including a magnetizable member comprising a plurality of particles having different resonant frequencies, a plurality of co-acting impedances having different resonant frequencies, means for saturating said particles, means for selectively energizing one of said impedances with current at its resonant frequency to alter the magnetic condition of the particle associated with said impedance, and means for detecting said change of magnetic condition.

5. A magnetic member having a plurality of resonant particles, a plurality of different LC appendages each corresponding to one of said resonant particles of said member, and means for selectively exciting said particles under conditions of saturation and non-saturation whereby the remanent flux is indicative of which particle is affected.

References Cited in the file of this patent

UNITED STATES PATENTS

| | | |
|---|---|---|
| 2,700,147 | Tucker | Jan. 18, 1955 |
| 2,714,714 | Anderson et al. | Aug. 2 ,1955 |
| 2,845,611 | Williams | July 29, 1958 |

OTHER REFERENCES

"A Radio-Frequency Nondestructive Readout For Magnetic-Core Memories," by Bernard Widrow, published December 1954, "IRE Transactions—Electronic Computers," vol. EC-3, issue 4, pp. 12–15.